(12) United States Patent
Mishra et al.

(10) Patent No.: US 11,953,743 B2
(45) Date of Patent: Apr. 9, 2024

(54) OPTICAL FIBRE RIBBON WITH OPTIMIZED NUMBER OF BONDS

(71) Applicant: Sterlite Technologies Limited, Gurugram (IN)

(72) Inventors: Atul Mishra, Gurugram (IN); Sourabh Singh Panwar, Gurugram (IN)

(73) Assignee: Sterlite Technologies Limited, Harayana (IN)

( * ) Notice: Subject to any disclaimer, the term of this patent is extended or adjusted under 35 U.S.C. 154(b) by 0 days.

(21) Appl. No.: 17/700,505

(22) Filed: Mar. 22, 2022

(65) Prior Publication Data

US 2023/0168453 A1  Jun. 1, 2023

(30) Foreign Application Priority Data

Nov. 29, 2021 (IN) .............................. 202111055206

(51) Int. Cl.
*G02B 6/44* (2006.01)

(52) U.S. Cl.
CPC .......... *G02B 6/4403* (2013.01); *G02B 6/4404* (2013.01)

(58) Field of Classification Search
CPC ............................. G02B 6/4403; G02B 6/4405
See application file for complete search history.

(56) References Cited

U.S. PATENT DOCUMENTS

| | | | | |
|---|---|---|---|---|
| 9,939,599 B2 * | 4/2018 | Blazer | ............... | G02B 6/4434 |
| 2014/0016905 A1 * | 1/2014 | Tanabe | ................ | G02B 6/4405 |
| | | | | 385/114 |
| 2018/0273427 A1 * | 9/2018 | Tanaka | ................. | C03C 25/105 |
| 2020/0400903 A1 * | 12/2020 | Tanaka | ................ | G02B 6/4404 |
| 2022/0269023 A1 * | 8/2022 | Kaneko | ................ | G02B 6/448 |

FOREIGN PATENT DOCUMENTS

| | | | | |
|---|---|---|---|---|
| EP | 3282295 A1 | * | 2/2018 | |
| JP | 2011-64874 A | * | 3/2011 | |
| JP | 2012-234122 A | * | 11/2012 | |
| JP | 5789630 B2 | * | 8/2015 | |
| JP | 6808686 B2 | * | 12/2020 | |
| KR | 2021-0145625 A | * | 12/2021 | |

OTHER PUBLICATIONS

Corning Optical Communications Generic Specification for Connectorization-Grade Optical Fiber Ribbons, Revision 5, Nov. 2016. retrieved via https://www.corning.com/catalog/coc/documents/generic-specifications/PGSF006.pdf (Year: 2016).*

* cited by examiner

*Primary Examiner* — Michael Stahl
(74) *Attorney, Agent, or Firm* — Steven R. Fairchild; Arun Narasani

(57) ABSTRACT

The present disclosure provides an optical fibre ribbon (100) with intermittent bonding. The optical fibre ribbon (100) includes a plurality of optical fibres (102). The plurality of optical fibres (102) are placed parallel to each other. The plurality of optical fibres (102) adjacent to each other are bonded intermittently along a length. The optical fibre ribbon (102) has a bond ratio of about 15 to 22. The bond ratio is a ratio of a number of a plurality of bonds (106) per unit length of the optical fibre ribbon (100) to a number of optical fibres in the optical fibre ribbon (100).

10 Claims, 3 Drawing Sheets

OPTICAL FIBRE RIBBON WITH OPTIMIZED NUMBER OF BONDS

TECHNICAL FIELD

The present disclosure relates to the field of optical fibre ribbon and, in particular, relates to an optical fibre ribbon with optimized number of bonds.

BACKGROUND

With the advancement of science and technology, various modern technologies are being employed for communication purposes. One of the most important modern communication technologies is the optical fiber communication technology using a variety of optical fiber cables. One such type of optical fiber cables are optical fiber ribbon cables. These optical fiber ribbon cables include a large number of optical fiber ribbons. An example of an optical fiber ribbon is an IBR (Intermittently Bonded Ribbon). Conventionally, the Intermittently Bonded Ribbon includes a plurality of optical fibers placed in parallel and further adjacent optical fibers are bonded intermittently along a length of the optical fibers by a plurality of connecting portions. Additionally, for making high fiber count cables, these ribbons are rolled and then bundled to be placed inside a core. Further, dimensions of the plurality of connecting portions are in range of a few millimetres. Furthermore, the ribbons must be mechanically strong enough to withstand handling and manufacturing operations. Moreover, the ribbon must be flexible enough so that it can be easily rolled for packing a large number of ribbons inside the core. However, to meet the above stated requirements, number of the plurality of connecting portions plays an important role. There is a need to optimize the number of the plurality of connecting portions with respect to total length of the ribbon to obtain IBRs with good mechanical strength and rollability.

JP5789630B2 discloses an optical unit and an optical fiber cable in which the rigidity of the optical unit in the longitudinal direction of the cable can be made uniform to reduce the loss of transmission loss and to prevent the buckling of the film. Three or more optical fibers are arranged in parallel and two adjacent optical fibers are connected by a connecting portion, and the connecting portion is arranged in the longitudinal direction of the tape core wire. Optical fiber tape core wire having an intermittent fixing structure provided intermittently and also in the width direction of the tape core wire and the optical fiber tape core wire are housed, and both end edges are overlapped in the circumferential direction.

JP6808686B2 discloses an intermittently connected optical fiber tape including a plurality of optical fibers arranged in the width direction and a connecting portion for intermittently connecting two adjacent optical fibers. The distance between the centers of the two adjacent optical fibers is larger than the diameter of the optical fiber, and the total volume contraction amount of the connecting portion per 1 m of one optical fiber is 0.00070 mm3/m. It is an intermittently connected optical fiber tape characterized by being below ° C.

The prior arts mentioned above do not mention about optimized number of bonds on optical fiber ribbon that provides necessary mechanical strength as well as rollability. In light of the above-stated discussion, there exists a need for an optical fibre ribbon that overcomes the above cited drawbacks of the conventional optical fibre ribbon.

SUMMARY

A primary object of the present disclosure is to provide an optical fibre ribbon with optimized number of bonds.

Another object of the present disclosure is to provide an optical fibre ribbon with optimized mechanical strength and rollability.

In an aspect, the present disclosure provides an optical fibre ribbon with intermittent bonding. The optical fibre ribbon includes a plurality of optical fibres. The plurality of optical fibres are placed parallel to each other. The plurality of optical fibres adjacent to each other are bonded intermittently along a length. The optical fibre ribbon has a bond ratio of about 15 to 22. The bond ratio is a ratio of a number of a plurality of bonds per unit length of the optical fibre ribbon to a number of optical fibres in the optical fibre ribbon.

BRIEF DESCRIPTION OF THE FIGURES

Figure 1:
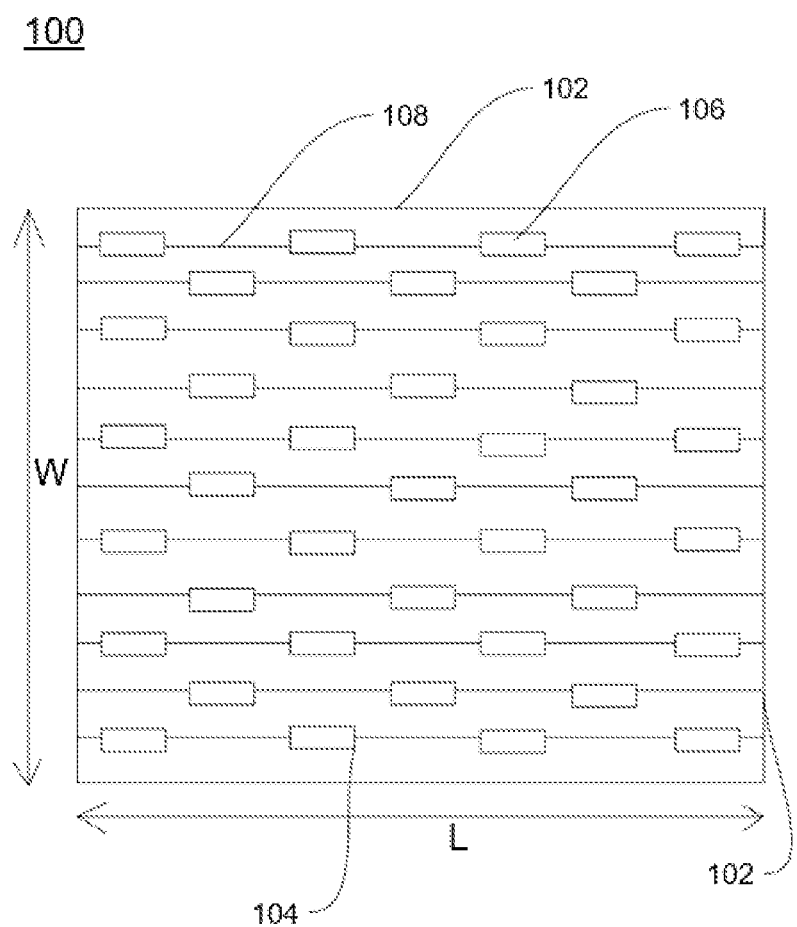
Figure 2:
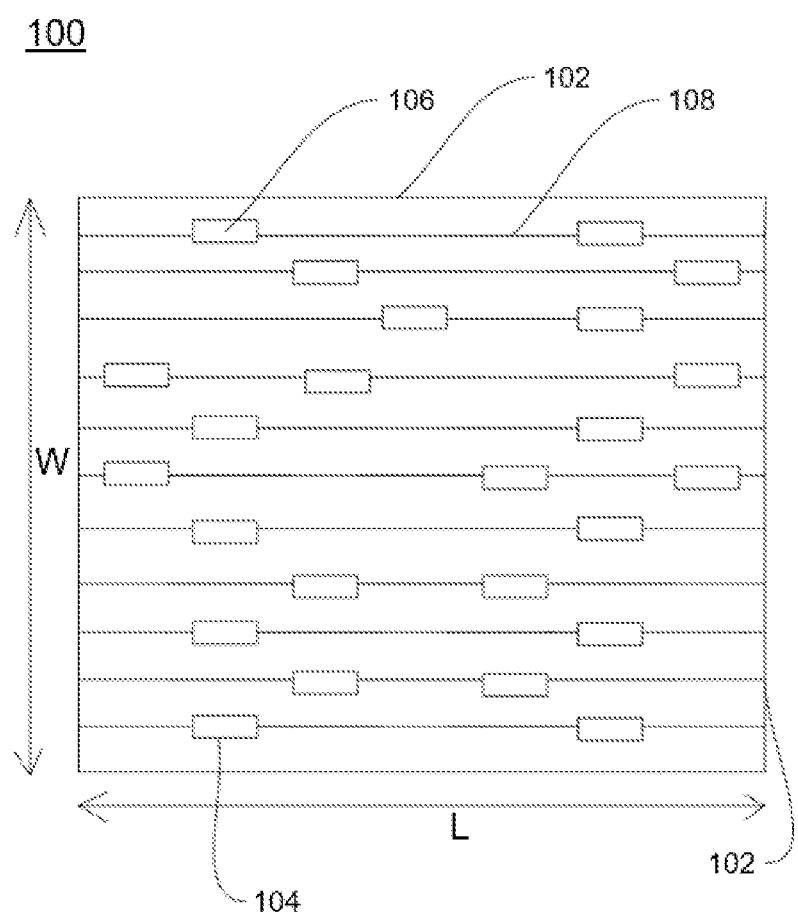
Figure 3:
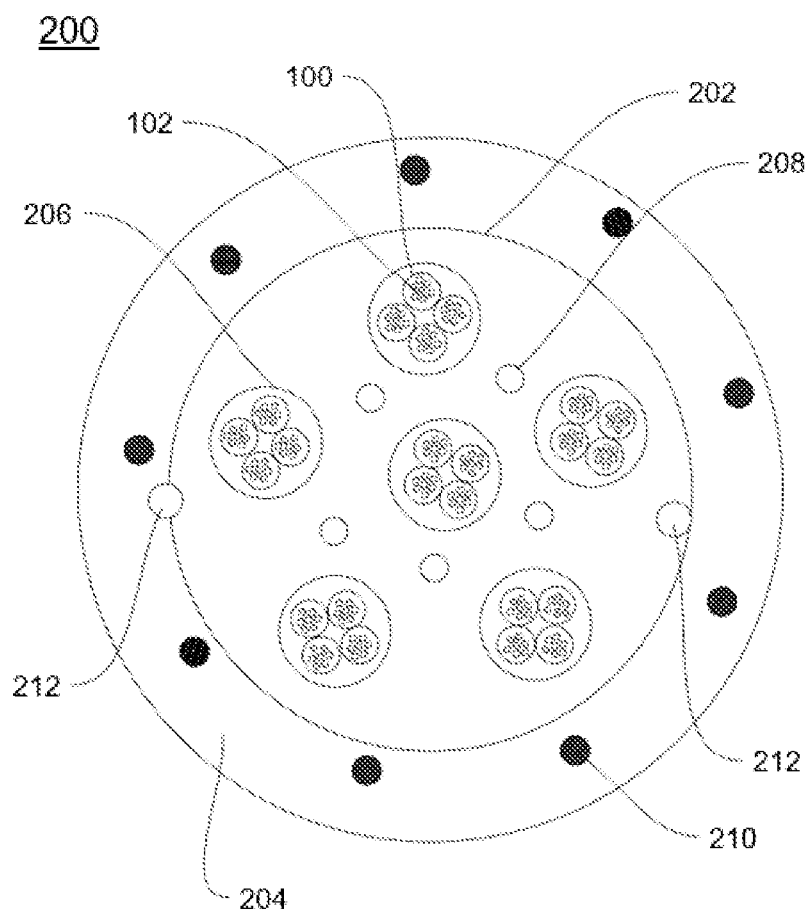

Having thus described the invention in general terms, reference will now be made to the accompanying drawings, which are not necessarily drawn to scale, and wherein:

FIG. 1 illustrates an optical fibre ribbon, in accordance with an aspect of the present disclosure;

FIG. 2 illustrates the optical fibre ribbon, in accordance with another aspect of the present disclosure; and FIG. 3 illustrates an example of optical fibre cable, in accordance with an aspect of the present disclosure.

It should be noted that the accompanying figures are intended to present illustrations of exemplary aspects of the present disclosure. These figures are not intended to limit the scope of the present disclosure. It should also be noted that accompanying figures are not necessarily drawn to scale.

DETAILED DESCRIPTION

Reference in this specification to "one aspect" or "an aspect" means that a particular feature, structure, or characteristic described in connection with the aspect is included in at least one aspect of the present technology. The appearance of the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but no other aspects.

Reference will now be made in detail to selected aspects of the present disclosure in conjunction with accompanying figures. The aspects described herein are not intended to limit the scope of the disclosure, and the present disclosure should not be construed as limited to the aspects described. This disclosure may be embodied in different forms without departing from the scope and spirit of the disclosure. It should be understood that the accompanying figures are intended and provided to illustrate aspects of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates an optical fibre ribbon 100, in accordance with an aspect of the present disclosure. FIG. 2 illustrates the optical fibre ribbon 100 with intermittent bonding, in accordance with another aspect of the present disclosure. In general, optical fibre ribbon includes number of optical fibres secured or embedded substantially parallel to one another with a matrix material. In addition, optical fibre ribbons are enclosed inside optical fibre cables that require high fibre counts within less installation space. The optical fibre ribbon 100 is mechanically robust. In addition, the optical fibre ribbon 100 is capable to withstand handling and manufacturing operations due to the high mechanical strength. In addition, the optical fibre ribbon 100 is flexible. The flexibility of the optical fibre ribbon 100 allows the optical fibre ribbon 100 to roll easily.

The optical fibre ribbon 100 includes a plurality of optical fibres 102, and a plurality of bonded portions 104. The plurality of optical fibres 102 are placed parallel to each other. Number of the plurality of optical fibres 102 in the optical fibre ribbon may be 12 (as shown in FIG. 1). In addition, number of the plurality of optical fibres 102 in the optical fibre ribbon 100 may be 8. Further, the number of the plurality of optical fibres 102 in the optical fibre ribbon 100 may be 16. Further, the number of the plurality of optical fibres 102 in the optical fibre ribbon 100 may be 24. Furthermore, the number of the plurality of optical fibres 102 in the optical fibre ribbon 100 may vary.

Each of the plurality of optical fibres 102 in the optical fibre ribbon 100 has a diameter of less than or equal to 250±10 microns. In addition, each of the plurality of optical fibres 102 in the optical fibre ribbon 100 may have the diameter of about 200 microns. Further, each of the plurality of optical fibres 102 in the optical fibre ribbon 100 may have the diameter of about 185 microns. Furthermore, each of the plurality of optical fibres 102 in the optical fibre ribbon 100 may have the diameter of about 160 microns. Moreover, each of the plurality of optical fibres 102 in the optical fibre ribbon 100 may have the diameter of any suitable range.

The plurality of optical fibres 102 are placed such that adjacent optical fibres of the plurality of optical fibres 102 are bonded at least intermittently along a length L of the optical fibre ribbon 100. The plurality of optical fibres 102 are bonded intermittently by a plurality of bonds 106 in the plurality of bonded portions 104. The plurality of optical fibers 102 are placed in contact with adjacent optical fibers.

Length of each of the plurality of bonded portions 104 and un-bonded portions 108 is greater than or equal to 5 millimeters. The number of the plurality of bonded portions 104 between at least one pair of adjacent optical fibers is between 10 and 40 in the optical fibre ribbon 100 of length 1 meter. The optical fibre ribbon 100 passes a twist test when a load of about 500±25 grams is applied on the optical fibre ribbon 100 of length 300±10 millimeters to rotate the optical fibre ribbon 100 at 180±10 degrees in each direction for at least 20 cycles at 10 to 20 cycles per minute. The plurality of bonds 106 are placed in a periodic manner or in a random manner along a longitudinal length of the optical fibre ribbon 100. In addition, the plurality of bonds 106 is placed on single side of the optical fibre ribbon 100. Alternately, the plurality of bonds 106 are placed on both sides of the optical fibre ribbon 100.

Each of the plurality of bonded portions 104 is followed by an un-bonded portion. Each of the plurality of bonds 106 has one of convex shape, concave shape, and flat shape. The plurality of bonds 106 may have any suitable shape of the like. Further, shape of the plurality of bonds 106 depends upon properties of matrix material and curing conditions. Matrix material is used to hold the plurality of optical fibres 102 together in the optical fibre ribbon 100. The plurality of bonds 106 may be arranged in any pattern (as shown in FIG. 2) in the rollable optical fibre ribbon 100. The distance between two bonds of the plurality of bonds 106 may be same. The distance between two bonds of the plurality of bonds 106 may be different. The plurality of bonds 106 are placed on single side of the optical fibre ribbon 100. The plurality of bonded portions 104 are placed on both sides of the optical fibre ribbon 100.

The optical fibre ribbon 100 has a bond ratio of about 15 to 22. The bond ratio is a ratio of a number of the plurality of bonds 106 per unit length of the optical fibre ribbon 100 to a number of the plurality of optical fibres 102 in the optical fibre ribbon 100. Based on the calculations, the bond ratio comes out to be 17 and 20 for 8 fiber ribbon and 24 fiber ribbon respectively. In addition, the bond ratio is 15 to 18 for the optical fibre ribbon 100 having less than 12 fibers. Further, the bond ratio is 19 to 22 for the optical fibre ribbon having equal to or more than 12 fibers. In an example, the optical fibre ribbon 100 with 8 fibres has 140 bonds in 1 m length L of the optical fibre ribbon 100. The bond ratio corresponding to 140 bonds is 17 (bond ratio=140/8=17). In another example, the optical fibre ribbon 100 having 24 optical fibres has 490 bonds in 1 m length L of the optical fibre ribbon 100. The bond ratio corresponding to 490 bonds is 20 (bond ratio=490/24=20).

The optical fibre ribbon 100 has a width W. The width W is in range of about 1.3 millimetre to 6 millimetre. The width W of the optical fibre ribbon 100 may vary depending upon diameter of the optical fibre and number of the plurality of optical fibres 102 in the optical fibre ribbon 100.

Number of the plurality of bonds 106 in a unit length (1 meter) of the optical fibre ribbon 100 is about 236 bonds for the optical fibre ribbon 100 having pitch in range of about 160-250 μm. In general, pitch is the distance between centres of two adjacent optical fibres. The number of the plurality of bonds 106 may vary. The number of the plurality of bonds 106 is optimized with respect to length L of the optical fibre ribbon 100 to obtain good mechanical strength and rollability. Each of the plurality of bonds 106 has a length of at least 5 millimeters. The plurality of bonds 106 may be present on single side of the optical fibre ribbon 100 or both sides of the optical fibre ribbon 100.

FIG. 3 illustrates an example of an optical fibre cable 200, in accordance with an aspect of the present disclosure. The optical fibre cable 200 is a high fibre count cable. The optical fibre cable 200 includes a core 202, and a sheath layer 204. In addition, the optical fibre cable 200 includes a plurality of bundles 206, a plurality of water swellable yarns 208, a plurality of embedded strength members 210, and one or more ripcords 212. The sheath layer 204 surrounds the core 202. The sheath layer 204 is an outer most layer of the optical fibre cable 200. The sheath layer 204 provides protection to the optical fibre cable 200 from environmental conditions. The environmental conditions include but may not be limited to rainfall, snowfall, wind, and sunlight.

The core 202 of the optical fibre cable 200 may be coated with a water blocking tape. In general, water blocking tape is applied to prevent penetration of water and moisture inside the optical fibre cable. The core 202 includes a plurality of bundles 206. The plurality of bundles 206 includes a plurality of optical fibre ribbons. Each of the plurality of optical fibre ribbons corresponds to the optical fibre ribbon 100 of FIG. 1 or FIG. 2. The plurality of optical fibre ribbons are rolled and bundled together to place inside the core 202 of the optical fibre cable 200. The plurality of rollable optical fibre ribbons are mechanically robust enough to withstand handling and manufacturing operations. Each of the plurality of optical fibre ribbons is flexible and may be rolled easily for packing large number of the plurality of optical fibre ribbons in the core 202 of the optical fibre cable 200. The number of bonds of the plurality of bonded portions 104 of the optical fibre ribbon 100 is optimized to obtain strong mechanical strength and flexibility. Further, the plurality of water swellable yarns 208 are placed inside the core 202 of the optical fibre cable 200. In an example, number of the plurality of water swellable yarns 208 is 5. Number of the plurality of water swellable yarns 208 may vary.

In an example, number of the plurality of optical fibres 102 in the core 202 of the optical fibre cable 200 is 432 (as shown in FIG. 3). Number of the plurality of optical fibres 102 in the core 202 of the optical fibre cable 200 may be 6912. Number of the plurality of optical fibres 102 in the core 202 of the optical fibre cable 200 may vary. The optical fibre cable 200 has high packing density.

The optical fibre cable 200 includes the plurality of embedded strength members 210. Each of the plurality of embedded strength members are embedded in the sheath of the optical fibre cable 200. Number of the plurality of embedded strength members 210 is at least 2.

The foregoing descriptions of pre-defined aspects of the present technology have been presented for purposes of illustration and description. They are not intended to be exhaustive or to limit the present technology to the precise forms disclosed, and obviously many modifications and variations are possible in light of the above teaching. The aspects were chosen and described in order to best explain the principles of the present technology and its practical application, to thereby enable others skilled in the art to best utilize the present technology and various aspects with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

We claim:

1. An optical fibre ribbon (100) with intermittent bonding, the optical fibre ribbon (100) comprising:
    a plurality of optical fibres (102), wherein the plurality of optical fibres (102) are placed parallel to each other, wherein the plurality of optical fibres (102) adjacent to each other are bonded intermittently along a length, wherein the optical fibre ribbon (100) has a bond ratio between 15 to 22, wherein the bond ratio is a ratio of a number of plurality of bonds (106) per unit length of the optical fibre ribbon (104) to a number of optical fibres in the optical fibre ribbon (100),
    wherein each of the optical fibre of the plurality of optical fibres (102) comprises a plurality of bonded portions (104) and un-bonded portions (108), wherein the plurality of optical fibres (102) are placed in contact with adjacent optical fibres,
    wherein the optical fibre ribbon (100) passes a twist test when a load of 500±25 grams is applied on the optical fibre ribbon (100) of length 300±10 millimeters to rotate the optical fibre ribbon (100) at 180±10 degrees in each direction for at least 20 cycles at 10 to 20 cycles per minute.

2. The optical fibre ribbon (100) as claimed in claim 1, wherein each of the plurality of optical fibres (102) has a diameter less than or equal to 250±10 microns.

3. The optical fibre ribbon (100) as claimed in claim 1, wherein length of each of the plurality of bonded portions (104) and un-bonded portions (108) is greater than or equal to 5 millimeters.

4. The optical fibre ribbon (100) as claimed in claim 1, wherein number of the plurality of optical fibres (102) in the optical fibre ribbon (100) is one of 8, 12, 16 and 24.

5. The optical fibre ribbon (100) as claimed in claim 1, wherein number of the plurality of bonded portions (104) between at least one pair of adjacent optical fibres is between 10 and 40 in the optical fibre ribbon (100) of length 1 meter.

6. The optical fibre ribbon (100) as claimed in claim 1, wherein the plurality of bonds (106) are placed in a periodic manner or in a random manner along a longitudinal length of the optical fibre ribbon (100).

7. The optical fibre ribbon (100) as claimed in claim 1, wherein the plurality of bonds (106) are placed on single side of the optical fibre ribbon (100), or wherein the plurality of bonds (106) are placed on both sides of the optical fibre ribbon (100).

8. The optical fibre ribbon (100) as claimed in claim 1, wherein the plurality of bonds (106) have one of concave shape, convex shape, or flat shape.

9. The optical fibre ribbon (100) as claimed in claim 1, wherein the bond ratio is 15 to 18 for the optical fibre ribbon (100) having less than 12 fibers.

10. The optical fibre ribbon (100) as claimed in claim 1, wherein the bond ratio is 19 to 22 for the optical fibre ribbon (100) having equal to or more than 12 fibers.

* * * * *